Patented June 4, 1940

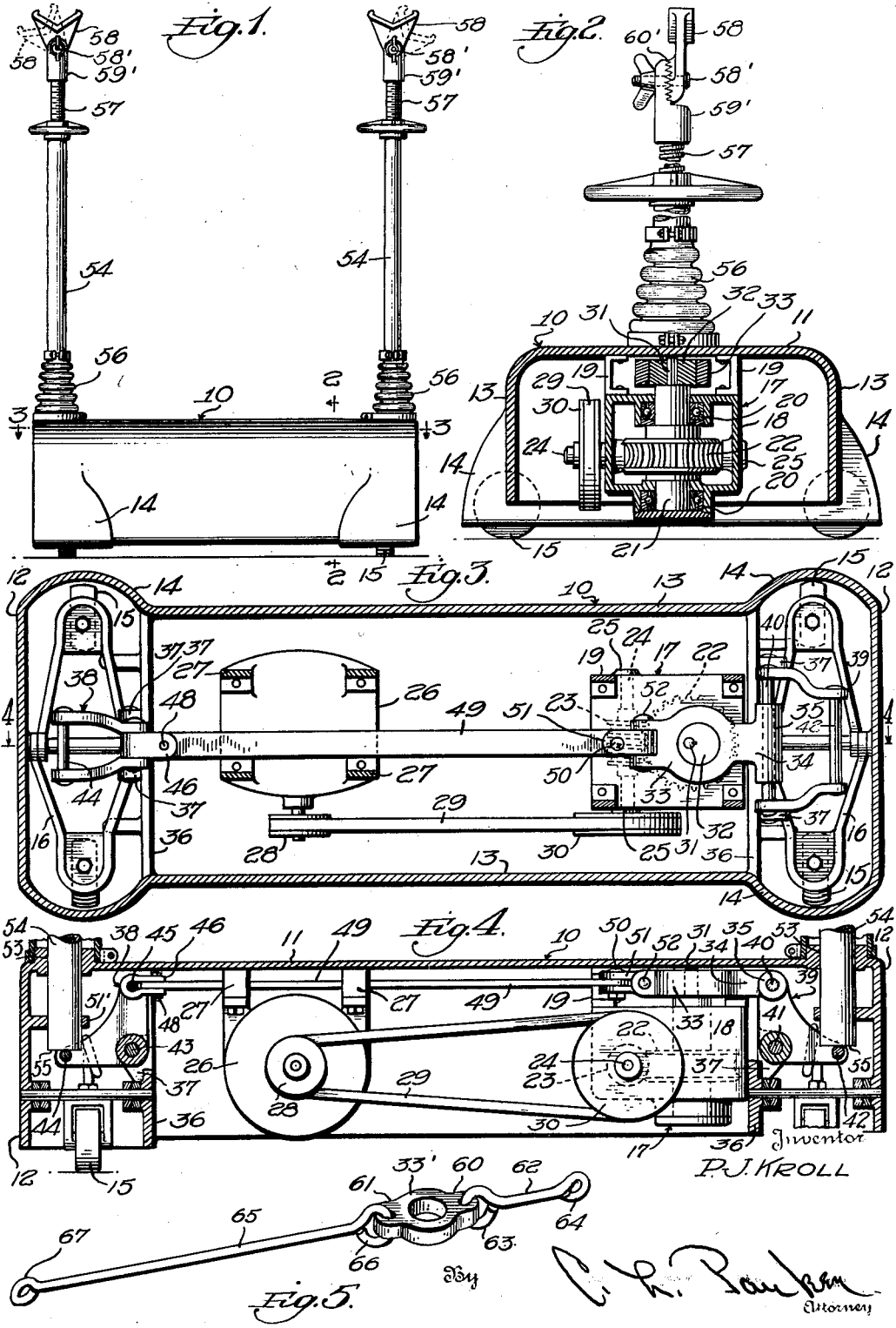

2,203,201

UNITED STATES PATENT OFFICE 2,203,201

VEHICLE ROCKING APPARATUS

Philip J. Kroll, New Orleans, La., assignor to Marjorie Kroll, Cambridge, Mass.

Application April 28, 1938, Serial No. 204,895

14 Claims. (Cl. 73—51)

This invention relates to vehicle rocking apparatus and is an improvement over the structures of my prior Patent No. 2,101,397, granted December 7, 1937, and of my copending application Serial No. 78,065, filed May 5, 1936.

Each of the prior structures referred to is intended for use in motor vehicle service stations for effecting lateral rocking movement of a motor vehicle body while lubricating such parts of the vehicle as the shackle bolts, springs, etc., the mechanisms serving to support the weight of the vehicle body to facilitate the entrance of the lubricant into the spring shackles.

Each of the prior constructions employs a pair of jack shafts engageable beneath opposite sides of the vehicle body, a pair of bell crank levers each having an arm engaging the lower ends of the jack shafts to alternately reciprocate the latter, and means for transmitting power to the other arms of the bell crank levers to effect operation thereof. The structure of my copending application No. 78,065 is an improvement over the structure of my prior patent referred to in that it provides a simpler and more efficient construction for performing the desired operations. In the copending application, a vertically extending power take-off shaft is provided with an eccentric engaging a crosshead slidably mounted on a shaft carried by a connection secured to a flexible strap element connected between the bell crank levers. Rotation of the power take-off shaft transmits reciprocating movement to the flexible strap to alternately pull the associated arms of the bell crank levers to alternately elevate the jack shafts, the transverse component of movement of the eccentric carried by the power take-off shaft being taken up by the slidable connection between the crosshead and the shaft referred to.

An important object of the present invention is to provide a vehicle rocking apparatus which operates on the same principles as the apparatus of my copending application referred to but wherein the structure is simplified and rendered more efficient in operation.

More specifically, an object of the present invention is to provide means for directly connecting the eccentric-operated element to one of the bell crank levers instead of employing a portion of the flexible motion transmitting strap for this purpose, and to employ a strap for transmitting motion to the other bell crank lever.

A further object is to provide a motion transmitting mechanism wherein the lateral component of movement of the driving eccentric is taken up by a slidable connection between the eccentric-operated member and one of the bell crank levers, thus eliminating the mechanism for this purpose directly associated with the flexible motion transmitting strap of the structure of my copending application.

A further object is to provide a strap for transmitting power to the other bell crank lever from the eccentric-operated member and to provide simple pivotal connections on the ends of the strap, thus eliminating the previous disadvantage of transmitting a certain amount of lateral force against the flexible strap and permitting free lateral movement of the crosshead.

A further object is to provide a vehicle rocking apparatus having vertically reciprocable jack posts for imparting rocking movement to a vehicle, and to provide the upper ends of the jack posts with vehicle-frame engaging members adjustable with respect to the jack posts to engage the side members of vehicle frames of different widths.

Other objects and advantages of the invention will become apparent during the course of the following description.

In the drawing I have shown two embodiments of the invention. In this showing:

Figure 1 is a side elevation of the apparatus,

Figure 2 is a transverse vertical section on line 2—2 of Figure 1,

Figure 3 is a horizontal section on line 3—3 of Figure 1, the jack shafts being omitted, Figure 4 is a vertical section on line 4—4 of Figure 3, parts being shown in elevation, and, Figure 5 is a detail perspective view of a modified form of motion transmitting means.

Referring to the drawing, the numeral 10 designates a preferably cast body which serves not only as a housing for the mechanical parts of the apparatus but also as supporting means therefor. The member 10 includes a top wall 11, end walls 12 and side walls 13. As shown in Figures 2 and 3, the side walls are bulged adjacent their ends as at 14 to provide space for supporting casters 15 carried by suitable supports 16. The arrangement of the casters forms no part of the present invention and may be of any type, or they may be eliminated. It is preferred that the casters be employed, however, to increase the portability of the device as will become apparent.

A reduction gearing indicated as a whole by the numeral 17 is arranged beneath the top wall 11 and includes a casing 18 secured to the lower ends of depending arms 19 secured at their upper ends to the top wall 11. As shown in Figure 2, the casing 18 is provided with upper and lower bearings 20 rotatably supporting a vertical shaft 21 carrying a worm wheel 22. This wheel meshes with a worm 23 carried by a shaft 24 extending transversely of the apparatus and journaled at its ends in bearings 25 carried by the casting 18.

A motor 26 is secured to depending arms 27 secured at their upper ends to the top wall 11, the motor 26 being of conventional type and inverted with respect to its usual position to be connected to the supports 27. The motor carries a pulley 28 around which passes a belt 29, and this belt as shown in Figures 3 and 4, passes around a pulley 30 carried by the shaft 24.

It will be apparent that the shaft 21 is the power take-off shaft of the reduction gearing. This shaft is vertically arranged and is provided at its upper end with a vertical stub shaft 31 which carries an eccentric cam 32 rotatable in an eccentric strap 33. This strap is provided with an extended portion 34 terminating in a lateral bearing 35 for a purpose to be described.

The casing is provided inwardly of the ends thereof with transverse walls 36 each of which carries a pair of spaced bearings 37 (Figure 4). These bearings are adapted to support bell crank levers 38 and 39 in the respective end portions of the casing, and it will be noted that the bell crank lever 39 comprises substantially triangular side plates having their inner ends spaced apart a substantial distance and connected by a shaft 40 on which the bearing 35 is slidable. The bell crank lever has its lower inner corner supported by a shaft 41 carried by the adjacent bearings 37. The outer corner of the bell crank lever 39 is provided with a transverse pin 42 for a purpose to be described. It will be apparent that upon rotation of the power take-off shaft 21, the eccentric 32 will rock the bell crank lever 39 about its shaft 41, the shaft 40 and bearing 35 taking care of the lateral component of movement of the eccentric strap 33.

The bell crank lever 38 is formed of substantially triangular plates as in the case of the bell crank lever 39 except that they are arranged substantially closer together, and the lower inner corner of the bell crank lever is provided with a shaft 43 supported by the adjacent bearings 37. The lower outer corner of the bell crank lever 48 is provided with a supporting pin 44 for the same purpose as the pin 42, as will be referred to later. The upper inner corner of the bell crank lever 38 is provided with a transverse pin 45 around which is a yoke member 46 pivotally connected by a vertical pin 48 to a horizontally extending flexible strap 49. The inner end of the strap 49 is connected by a vertical pivot 50 to a yoke member 51 passing around a transverse pin 52 carried by the eccentric strap 33.

The top wall 11 is provided with bearing openings 53 through which jack posts 54 extend, the lower ends of these posts being squared as at 55 to rest upon the respective pins 42 and 44. The openings 53 support the jack posts for vertical movement and are assisted in such function by guide bearings 51' preferably formed integral with the respective end walls 12. A rubber or similar boot 56 surrounds each jack post with its upper end secured to the jack post and its lower end to the top wall 11 to exclude the entrance of dirt or other foreign material into the bearing openings 53 or the casing 10.

Each of the jack posts 54 is tubular except at its lower end and the upper end of each jack post slidably receives a threaded jack shaft 57 having a vehicle engaging member 58 at its upper end. Each member 58 is connected by a bolt 58' to a collar 59' secured to the upper end of the associated jack shaft 57, and the members 58 and 59' are provided with serrated engaging portions 60' whereby the bolt 58' may fix the engaging member 58 in adjusted positions. A hand wheel 59 is threaded on each jack shaft and seats on the upper end of the associated jack post whereby rotation of each hand wheel is adapted to adjust the height of the associated member 58 for engagement with the frame of the vehicle, as will become apparent.

In Figure 5 of the drawing a slightly modified form of the invention is shown. Such modified form comprises an alternative means for transmitting power from the eccentric 32 to the bell crank levers 38 and 39. In the modified form of the invention an eccentric strap 33' is substituted for the strap 33 and is provided with oppositely extending apertured ears 60 and 61. A link 62, formed of ordinary rodding has a hook 63 formed at one end for engagement in the aperture of the ear 60, and an eye 64 is formed in the other end of the link and surrounds the shaft 40 of the bell crank lever 39. It will be obvious that with the modified form of the invention the bell crank lever 39 could be identical with the bell crank lever 38 since there is no lateral sliding movement of the eye 64 with respect to the shaft 40. A longer link 65 is bent at one end to form a hook 66 engageable in the aperture of the ear 61, the other end of the link 65 being formed into an eye 67 adapted to surround the pin 45.

The operation of the form of the invention shown in Figures 1 to 4 inclusive is as follows:

The casters 15 are preferably employed to render the apparatus readily portable, as previously stated. These casters form no part of the present invention and serve the same purpose as the casters disclosed in my prior patent and copending application identified above. The operator may tilt the apparatus whereby it is supported by two casters at one side of the apparatus and the jack posts 54 may be employed as handles for rolling the apparatus much after the fashion of a hand truck. When the apparatus is properly positioned beneath a vehicle supported on a suitable lift, the jack posts are swung to a vertical position whereupon the hand wheels 59 are rotated to move the jack shafts upwardly and bring the members 58 into engagement with the side frame members of the vehicle chassis. The hand wheels preferably are further rotated to relieve the vehicle springs and shackles of a portion of the weight of the vehicle body. In this connection it is pointed out that the casters are preferably mounted for upward movement with respect to the body 10 when the hand wheels are turned for the purpose described, whereby the bottom of the body 10 will seat squarely on the supporting surface on which the apparatus is used. A suitable mounting for the casters for the purpose stated is shown in my copending application referred to and need not be described in detail.

With the apparatus in position for operation as described the motor 26 is started and the belt 29 drives the pulley 30 to rotate the shaft 24. The worm 23 rotates the worm wheel 22 to drive the shaft 21 at a reduced speed, and any suitable motor speed or speed reduction ratio between the worm and worm wheel may be provided to rotate the shaft 21 at the desired speed.

Rotation of the shaft 21 obviously rotates the cam 32 thereby effecting movement of the eccentric strap 33 in an orbital path. So far as the bell crank lever 39 is concerned, the component of movement of the eccentric strap 33 transversely of the apparatus is taken up by sliding movement of the bearing 35 on the shaft 40. The same movement is taken up with respect to the bell crank lever 38 by the pivotal connections 48 and 50. Accordingly it will be apparent that the eccentric strap 33 transmits movement to the bell crank levers only longitudinally with respect to the apparatus.

It will be apparent that when the eccentric strap 33 moves to the right as viewed in Figure 4, the weight of the vehicle moves the right hand jack post downwardly to turn the bell crank lever 39 in a clockwise direction about its pivot shaft 41. At the same time, a pulling force will be transmitted to the right hand end of the flexible strap 49 to turn the bell crank lever 38 in a clockwise direction about its pivot shaft 43 thus elevating the pin 44 and moving the adjacent jack post upwardly to elevate the corresponding side of the vehicle body. Movement of the eccentric strap 33 to the left reverses the foregoing operation, the bell crank levers 38 and 39 being turned in a counter-clockwise direction to raise the right hand jack post 54 and elevate the corresponding side of the vehicle and lower the left hand jack post 54 and thus lower the corresponding side of the vehicle. Accordingly it will be apparent that the bell crank levers will be rocked back and forth during the operation of the apparatus to alternate the raising and lowering of the jack posts and thus rock the vehicle body transversely. During such rocking movement, the springs, spring shackles, etc., can be lubricated very effectively, the relative movement of the parts due to the rocking action facilitating the entrance of the lubricant into the desired places. Moreover, the apparatus facilitates the locating of squeaks in the vehicle to permit them to be eliminated.

It will be noted that the transverse component of movement of the eccentric strap 33 takes place freely without transmitting any force to the flexible strap 49 tending to flex or distort such element. Instead of connecting the power take-off shaft to a flexible strap extending between the bell crank levers as in my copending application referred to, power is applied in the present case directly to one bell crank lever and to the other bell crank lever through the medium of a flexible strap which terminates at the adjacent side of the eccentric strap 33. The flexible strap 49 being free to turn about its pivots 48 and 50, is relieved of any transverse forces which would tend to flex or distort it. Accordingly the apparatus is simpler and more efficient in operation than the prior structures referred to.

In the form of the invention shown in Figure 5, the direct connection between the flexible strap and the bell crank lever 39 is eliminated in favor of the short link 62 which pivots at its ends on its respective connections with the eccentric strap 33 and the right hand bell crank lever. Accordingly such form of the invention also permits the use of relatively light tension members between the power shaft 21 and the two bell crank levers instead of the relatively heavy and more expensive rigid connection shown in my prior patent referred to and without the transmission of any lateral forces to the tension motion transmitting member of my copending application referred to.

In this connection it will be noted that since at least a portion of the weight of the vehicle is always supported by each of the jack posts, such weight tends always to turn the bell crank lever 38 in a counter-clockwise direction and the bell crank lever 39 in a clockwise direction. Accordingly the motion transmitting connections between the pins 40 and 45 are kept always under tension thus facilitating the use of relatively light tension means for transmitting motion to the bell crank lever. Thus the apparatus may employ relatively light motion transmitting means since it is never necessary for the eccentric strap 33 or 33' to exert any force under compression or toward the bell crank levers. The present device, as previously stated, eliminates any tendency to twist or distort the flexible strap 49 and the assembly is simpler and more efficient than that shown in my copending application and is more readily assembled and disassembled.

It will be noted that the openings 53 through which the jack posts extend, together with the bearing members 51', support the jack posts 54 for vertical reciprocatory movement. Accordingly, the jack posts operate in fixed parallel relation to each other. However, vehicle frames vary in width and to accommodate the apparatus to different vehicle frames the members 58 are connected with respect to the jack shafts by the bolts 58' and the serrated engaging faces 60', below the tops of the engaging members. Accordingly the bolts 58' may be loosened to permit the engaging members 58 to swing inwardly or outwardly to accommodate the apparatus to vehicle frames of varying widths, whereupon the bolts 58' may be tightened to fix the positions of the members 58. It also will be noted that the lower ends of the jack posts merely rest in their operative positions and may be removed merely by lifting them vertically. It will be noted that all of the working parts of the apparatus are housed within the body 10, thus protecting the mechanical parts of the apparatus and preventing any possible injury to the workmen. The housing is unobstructed between the jack posts thus permitting an operator to step over the housing when moving from one end of the vehicle to the other. Moreover, the housing is formed of a single casting and acts, in itself, as the supporting means for all of the working parts of the apparatus without the use of a separate form of supporting means for this purpose.

It is to be understood that the forms of the invention herewith shown and described are to be taken as preferred examples of the same and that various changes in the shape, size and arrangement of parts may be resorted to without departing from the spirit of the invention or the scope of the subjoined claims.

I claim:

1. Apparatus of the character described comprising a pair of spaced upstanding jack posts, actuating means connected to each jack post, and motion transmitting means connected between said actuating means and comprising a member movable in an orbital path, a connection pivoted at its ends to said member and to one of said actuating means, and a connection between said movable member and the other of said actuating means whereby one component of movement of said member will actuate the latter actuating means while permitting said member to move freely at right angles to such component of movement.

2. Apparatus of the character described comprising a pair of spaced upstanding jack posts, actuating means connected to each jack post, and motion transmitting means connected between said actuating means and comprising a member movable in an orbital path, a connection pivoted at its ends to said member and to one of said actuating means, and a slidable connection between said movable member and the other actuating means to permit said movable member to move freely transversely with respect to a line between said actuating means.

3. Apparatus of the character described comprising a pair of spaced upstanding jack posts, actuating means connected to each jack post, and motion transmitting means connected between said actuating means and comprising a member movable in an orbital path, a connection pivoted at its ends to said member and to one of said actuating means, and a single rigid link pivotally connected at its ends to said movable member and to the other of said actuating means.

4. Apparatus of the character described comprising a pair of spaced upstanding jack posts, a pair of bell crank levers each having one arm connected to one of said jack posts, said bell crank levers being oppositely arranged, and motion transmitting means connected between the other arms of said bell crank levers and comprising a member movable in an orbital path, and separate connections between said movable member and each of said other arms of said bell crank levers.

5. Apparatus of the character described comprising a pair of spaced upstanding jack posts, a pair of bell crank levers each having one arm connected to one of said jack posts, said bell crank levers being oppositely arranged, and motion transmitting means connected between the other arms of said bell crank levers and comprising a member movable in an orbital path, and separate connections between said movable member and each of said other arms of said bell crank levers, one of said connections being a link pivotally connected at one end to said movable member and at its other end to said other arm of one of said bell crank levers.

6. Apparatus of the character described comprising a pair of spaced upstanding jack posts, a pair of bell crank levers each having one arm connected to one of said jack posts, said bell crank levers being oppositely arranged, and motion transmitting means connected between the other arms of said bell crank levers and comprising a member movable in an orbital path, and separate connections between said movable member and each of said other arms of said bell crank levers, one of said connections being a link pivotally connected at one end to said movable member and at its other end to said other arm of one of said bell crank levers, the other connection being a slidable connection between said movable member and said other arm of the other bell crank lever for permitting free movement of said movable member transversely with respect to the latter bell crank lever.

7. Apparatus of the character described comprising a pair of spaced upstanding jack posts, a pair of bell crank levers each having one arm connected to one of said jack posts, said bell crank levers being oppositely arranged, and motion transmitting means connected between the other arms of said bell crank levers and comprising a member movable in an orbital path, and a pair of links each having one end pivotally connected to said movable member and its other end pivotally connected to said other arm of one of said bell crank levers.

8. Apparatus of the character described comprising a pair of spaced upstanding jack posts, a pair of bell crank levers each having an upstanding arm and an arm extending in a direction away from the other bell crank lever and connected to one of said jack posts, and substantially horizontal motion transmitting means connected between the upstanding arms of said bell crank levers and comprising a member movable in an orbital path and separate connections between said movable member and each of said upstanding arms.

9. Apparatus of the character described comprising a pair of spaced upstanding jack posts, a pair of bell crank levers each having an upstanding arm and an arm extending in a direction away from the other bell crank lever and connected to one of said jack posts, and substantially horizontal motion transmitting means connected between the upstanding arms of said bell crank levers and comprising a member movable in an orbital path and separate connections between said movable member and each of said upstanding arms, one of said connections being a link pivoted on vertical axes at its ends respectively to said movable member and to one of said upstanding arms.

10. Apparatus of the character described comprising a pair of spaced upstanding jack posts, a pair of bell crank levers each having an upstanding arm and an arm extending in a direction away from the other bell crank lever and connected to one of said jack posts, and substantially horizontal motion transmitting means connected between the upstanding arms of said bell crank levers and comprising a member movable in an orbital path and separate connections between said movable member and each of said upstanding arms, one of said connections being a link pivoted on vertical axes at its ends respectively to said movable member and to one of said upstanding arms, the other connection being a slidable connection for permitting free movement of said movable member transversely of the other bell crank lever.

11. Apparatus of the character described comprising a pair of spaced upstanding jack posts, a pair of bell crank levers each having an upstanding arm and an arm extending in a direction away from the other bell crank lever and connected to one of said jack posts, and substantially horizontal motion transmitting means connected between the upstanding arms of said bell crank levers and comprising a member movable in an orbital path, and a pair of links each having one end pivoted on a vertical axis to said movable member, the other ends of said links being pivoted on vertical axes to the respective upstanding arms of said bell crank levers.

12. Apparatus of the character described comprising a pair of substantially vertical jack posts, a pair of bell crank levers mounted to swing on horizontal axes and each having an upstanding arm and an outstanding arm extending in a direction away from the other bell crank lever and connected to one of said jack posts, a substantially vertical shaft having an eccentric at its upper end, an eccentric strap surrounding said eccentric to be moved thereby in a horizontal plane, and connections between said eccentric strap and the upstanding arms of said bell crank levers, one of said connections being pivoted at its ends on vertical axes to said eccentric strap and to the upstanding arm of one of said bell crank levers, and the other connection being mounted to permit free movement of said eccentric strap laterally with respect to the other bell crank lever.

13. Apparatus of the character described comprising a pair of substantially vertical jack posts, a pair of bell crank levers mounted to swing on horizontal axes and each having an upstanding arm and an outstanding arm extending in a direction away from the other bell crank lever and connected to one of said jack posts, a substantially vertical shaft having an eccentric at its upper end, an eccentric strap surrounding said eccentric to be moved thereby in a horizontal plane, a link pivoted on vertical axes at its ends respectively to said eccentric strap and to the upstanding arm of one of said bell crank levers, and a connection between said eccentric strap and the upstanding arm of the other bell crank lever, said connection being arranged to rock the latter bell crank lever on its axis and to permit free movement of said eccentric strap transverse to the plane of movement of the latter bell crank lever.

14. Apparatus of the character described comprising a pair of substantially vertical jack posts, a pair of bell crank levers mounted to swing on horizontal axes and each having an upstanding arm and an outstanding arm extending in a direction away from the other bell crank lever and connected to one of said jack posts, a substantially vertical shaft having an eccentric at its upper end, an eccentric strap surrounding said eccentric to be moved thereby in a horizontal plane, and a pair of links each pivotally connected at one end on a vertical axis to said eccentric strap and pivotally connected at its other end on a vertical axis to the upstanding arm of one of said bell crank levers.

PHILIP J. KROLL.